(12) United States Patent
Tormasov et al.

(10) Patent No.: US 8,069,218 B1
(45) Date of Patent: Nov. 29, 2011

(54) SYSTEM, METHOD AND COMPUTER PROGRAM PRODUCT FOR PROCESS MIGRATION WITH PLANNED MINIMIZED DOWN-TIME

(75) Inventors: Alexander G. Tormasov, Moscow (RU); Stanislav S. Protassov, Moscow (RU); Serguei M. Beloussov, Singapore (SG)

(73) Assignee: Parallels Holdings, Ltd. (BM)

( * ) Notice: Subject to any disclaimer, the term of this patent is extended or adjusted under 35 U.S.C. 154(b) by 461 days.

(21) Appl. No.: 11/963,904

(22) Filed: Dec. 24, 2007

Related U.S. Application Data

(63) Continuation-in-part of application No. 10/837,618, filed on May 4, 2004.

(60) Provisional application No. 60/467,547, filed on May 5, 2003.

(51) Int. Cl.
*G06F 15/167* (2006.01)
(52) U.S. Cl. ........................................ 709/216; 709/212
(58) Field of Classification Search .................. 709/216, 709/212; 718/1
See application file for complete search history.

(56) References Cited

U.S. PATENT DOCUMENTS

| | | | |
|---|---|---|---|
| 7,484,208 B1* | 1/2009 | Nelson | 718/1 |
| 2006/0117300 A1* | 6/2006 | Puthukattukaran et al. | 717/124 |
| 2008/0059726 A1* | 3/2008 | Rozas et al. | 711/156 |

* cited by examiner

*Primary Examiner* — Ario Etienne
*Assistant Examiner* — Hee Kim
(74) *Attorney, Agent, or Firm* — Bardmesser Law Group

(57) ABSTRACT

A system, computer program product and method for a running process migration with planned minimized down-time. The method facilitates fast and efficient process migration by performing background data synchronization prior to actual process migration. The service slowdown is reduced by employing two-stage transfer method. During a first stage the service, being executed on the original machine, does not stop and all the available data required by this process is being copied. After the first stage is completed the service continues to be executed without an interruption, while the most of the data associated with the service process is already transferred to the new machine. During the second stage the execution of the service on the first machine is stopped. The files, which were not available during the first stage, are now copied. Then the execution of service is started on the second machine. The down-time is reduced to the duration of the second stage.

23 Claims, 9 Drawing Sheets

SYSTEM, METHOD AND COMPUTER PROGRAM PRODUCT FOR PROCESS MIGRATION WITH PLANNED MINIMIZED DOWN-TIME

CROSS-REFERENCE TO RELATED APPLICATION

This application is a continuation-in part of U.S. patent application Ser. No. 10/837,618, filed on May 4, 2004, entitled SYSTEM, COMPUTER PROGRAM PRODUCT AND METHOD FOR ONLINE DATA MIGRATION WITH MINIMAL DOWN-TIME, which is a non-provisional application of U.S. Provisional Patent Application No. 60/467,547, filed May 5, 2003, which are both incorporated by reference herein in their entirety.

BACKGROUND OF THE INVENTION

1. Field of the Invention

The present invention relates to process and data migration, and more specifically, to safe transmitting active processes from one server to another with minimized down-time.

2. Related Art

Human beings are becoming increasingly dependent on computer systems. From simple home computers, which are used for word processing and Internet access, to high speed, multi-processor systems powering genomic research and simulating nuclear explosions, computers have permeated society. As computer use continues to increase and people become even more dependent on them, people need access to the information stored on computer systems on a continual basis.

One approach to providing continuous access is to make information available through multiple servers, where each of the servers performs the same task. In such an arrangement, the remaining server or servers can continue to provide information in the event one of the servers fails. While such an approach is advantageous for mission-critical information, implementation costs associated with such configurations can be considerable. Not only does such an approach require additional servers, which can significantly increase the costs, but such an approach also requires additional hardware and/or software to properly direct network traffic, balance the load placed on the servers, and other related and similar functions.

Although a large share of the information on the Internet, and even within corporate intranets, is not mission-critical, it is still desirable to minimize and plan down-time associated with even non-mission-critical information. For example, the time that a company's web site is unavailable can result in lost sales and decreased customer satisfaction.

An unfortunate reality is that servers must be down for a certain period of time for routine maintenance, such as applying operating system patches or hardware and/or software upgrades. Also, when old servers are replaced with new servers, the transition from one physical server to another requires interruption of service for a period of time. Transitioning, or migrating processes running on one server to another in such circumstances is generally referred to as "process migration."

Other reasons for migration may include the need for a security patch, a need to reduce the load on a particular server, which is overloaded at the moment, a software upgrade. Generally the system administrator can decide for whatever reasons that a particular process should be migrated to a different server, etc.

An example of a conventional process transfer method is illustrated in FIG. 1. As shown in FIG. 1, process migration typically involves first shutting down a computer processes running on a first server, such as processes providing access to E-mail, stored files, or the like (step 100). A file copying process is then initialized (step 110). The file copying process typically copies only files associated with the process of concern (i.e., E-mail, file server, or the like) to the new server (step 120). The file copy process continues until all appropriate files have been copied (step 130). The process or processes of concern is then launched on the new server (step 140).

Typically, the following conventional methods for service transfer are used. A direct transfer method implies direct transfer of a service process or processes from one physical machine to another physical machine. The direct transfer is only possible if both machines use the same operating system and the same set of files.

Direct migration/transfer of all the processes supported by the operating systems yields optimal results as it requires no server disconnection. With smooth service migration and zero down-time this method appears to be the most efficient. However, in reality, this method does not always work because the service has to be supported by its own operating system so that all of the system settings and parameters exist at the new machine at all times.

The same is true for a file system. Migration processes require that all of the content of the files residing on both machines are absolutely identical. Such architecture is quite a challenge for a designer of an operating system. So far there are only experimental distributed operating systems and special development projects for operating system kernel modification have been implemented (for example, the MOSIX project developed for Linux operating system kernel).

Modern conventional operating systems do not support services of this kind due to numerous technological difficulties. For instance, regular implementations of UNIX type Linux, Sun Solaris, HP HPUX, FreeBSD, various versions of Microsoft Windows operating systems, Apple Mac OS X and others do not contain the necessary tools for effective process migration discussed above.

Another method of service migration with scheduled non-zero down-time is easier to implement. This method implies that the service at first is stopped at the original machine and only after that gets lunched at the new machine. The stoppage of the process, however short it may be, requires more than just restart of the processes and services on a new machine. It also requires that all of the data is absolutely identical on both of the machines.

Use of the network file systems, such as Sun Microsystems' NFS (Network File System) for UNIX, allows for maintaining the identical data at more than one machine. This system de facto represents a standard for UNIX operating systems and is implemented (for both the client and the server) in all of modern operating systems. The files used by a process or a service are located on a file server. The two machines are equipped with client sets of the corresponding file systems providing for visibility of the files. All changes to the files made by the process or the service are traced and copied to the file server by the file system.

The updated files are immediately accessible for use by the migrated processes. Thus, the transferred/migrated process can be immediately launched at the new machine provided that the proper software has been installed. This system nevertheless has certain shortcomings. One of the disadvantages of this method is very high requirements for the network file systems. For example, NFS (Network File System) is implemented in such a way that loss of connection between the two machines affects their performance significantly. In some instances, applications using files from a file server and from operating system slow down or stop their execution completely.

Another disadvantage of this method is scalability of the system. Modern network file systems (such as NFS) are limited by the number of clients that could be successfully served by an average workgroup server. This number ranges from 10 to 100.

Yet another disadvantage is typically referred to as "a single failure point." The single failure point means that a disconnection of a file server disables all of the machines that use this file server. Thus, the method using a dedicated file server is very often unacceptable. This problem can be solved by synchronization of data by the technique of an online mirror backup, also referred to as Redundant Arrays of Independent Disks (RAID).

The principle of a mirror backup is quite simple: as the operating system stores a record into the disk sector where the file data is stored, the record is written to the disk and to its mirror backup. This provides for precise copying of all of the disc stored data. Essentially, this method requires disks duplicating. Therefore, data mirroring is quite expensive and inefficient. It is also difficult to implement and usually not very convenient to implement, because a server for storing the data copies should be determined prior to the service launch. Change of the location of the service launch will require moving of all the data from its old location.

The easiest way to solve this problem is to copy data directly for the time interval between the stoppage of the service or process at the original machine and its restart at the new machine. However, long time required for copying data of a large size is a great disadvantage of this method. Physical time of the transfer in this case equals the planned down-time of the service.

As discussed herein, a service transfer or a service migration from one physical machine to another requires server function interruption. A need exists, therefore, for software and hardware updates as well as regular service reorganization and reconfiguration that do not result in results in scheduled and unscheduled server function interruption.

Furthermore, a process and services it provides may be unavailable for significant periods of time, depending on the number and size of the files to be copied. Even with respect to non-mission-critical information, the time required to copy the files can have significant and unfortunate effects on a business.

Accordingly, there is a need for an efficient method for process migration with planned minimized down-time.

SUMMARY OF THE INVENTION

The preferred embodiment is directed to a system, method and computer program product for process and data migration, and more specifically, to synchronizing data and services during planned process migration with minimized down-time.

An embodiment of the present invention is directed to transfer or migration of an executable (running) process from a first server to a second server with minimized service slowdown. The proposed method facilitates fast and efficient process migration by performing background data synchronization prior to the actual process migration. Although the discussion herein will focus on process migration, and specifically the migration of a single process of concern, it should be apparent to those skilled in the art that the present invention may be adapted for other uses, and the number of processes of concern that can be migrated may be greater than one, without departing from the spirit or the scope of the invention.

As used herein, file synchronization, also referred to as data synchronization, is a process in which entire files or portions of files are copied from a first location to a second location. The data synchronization is involved pages synchronization and files synchronization. One advantage of data synchronization over traditional file copying is that data synchronization can, for example, be performed in a bitwise, byte-wise, or other manner that compares a file on the first server and the corresponding file on the second server, and may only synchronize those bits that have changed on the first server to the second server. Data synchronization can be particularly advantageous for large files, such as database files or log files.

When the background synchronization has been completed, the process of concern is stopped on the first server. Any files that have changed since the most recent data synchronization or that could not be synchronized because they were locked or otherwise in use, are preferably synchronized with the second server, and the process of concern is initiated on the second server.

Another embodiment is directed to reducing the server down-time by employing a two-stage transfer method. According to this embodiment, during a first stage the service, which is executed on the original machine, the process of concern does not stop and all the available data required by this process is being copied. After the first stage is completed the service continues to be executed without interruption, while the most of the data associated with this process is already transferred to the new machine.

During a second stage, the execution of the service on the first machine is stopped. The files, which were not available during the first stage, are now copied. Thus, the data on the two machines becomes identical. Then the execution of the process is started on the second machine. Therefore, the service slowdown is reduced to just the duration of the second stage.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
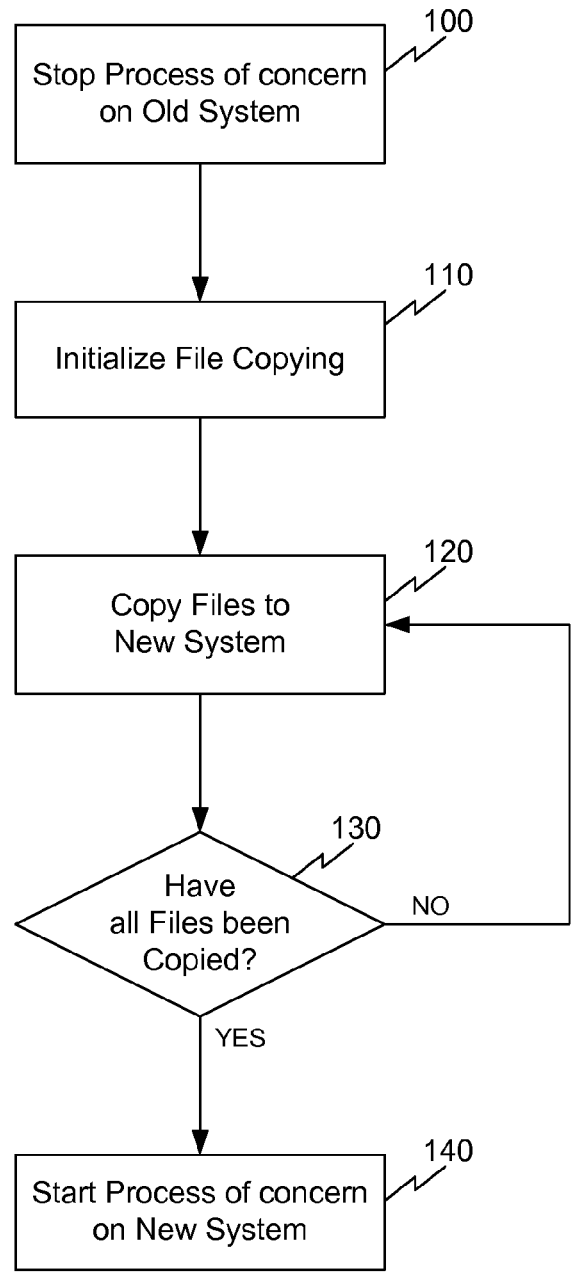
FIG. 1 illustrates a conventional process migration and data synchronization method.

Reference will now be made in detail to the preferred embodiments, examples of which are illustrated in the accompanying drawings.

The preferred embodiments are intended to significantly reduce the service slowdown when a process of concern is shut down on one server and when the same process can be initiated on another server. One application is in implementing a scheduled migration of a process (as opposed to unforeseen migration, such as due to a crash, or a system failure, or due to a hardware failure).

The proposed method is directed to a situation where the migration is planned or desired, for example, due to a software upgrade of the server, or due to an upgrade of a physical server. The proposed method provides for minimization of the down-time during such a planned process migration.

The process being migrated may be, for example, a Virtual Environment (VE), a Virtual Machine (VM) (for example, VMware Virtual Machine, Parallels Software International Virtual Machine, Xen systems by XenSource, Microsoft Virtual Server etc.), a webserver, a file server, an FTP server, an authentication server, a chroot environment server, a jail environment, a sand box environment server, a print server or a WINDOWS Terminal Service. Other examples of a server process include POP3 servers, an IMAP/IMAP4 servers, a SMTP (Simple Mail Transfer Protocol) servers, web servers, scheduler servers, a COM/COM+/DCOM (Component Object Model/extended COM/Distributed COM) servers, cryptographics servers, browser servers, DHCP (Dynamic Host Configuration Protocol) servers, Distributed file system servers, Distributed Link tracking servers, event log servers, reporting servers, DNS (Domain Name Servers) servers, file replicator servers, SSL (Secure Socket Layer) servers, indexing servers, firewall servers, KERBEROS servers, IPSEC servers (IPSEC is a protocol suite used for secure communication at a network layer between two peers), instant messaging servers, message write (messenger) servers, logon servers, Network DDE (Dynamic Data Exchange) servers, NLA (Network Location Awareness) servers, performance logs and alerts servers, plug and play servers, print spooler servers, protected storage servers, disk encryption servers, routing servers, remote access servers, security account manager servers, system event notification servers, telnet servers, telephony servers, uninterruptible power supply servers, virtual disk servers, WINDOWS installer servers, WINDOWS management instrumentation wireless configuration servers, WMI (WINDOWS Management Instrumentation) performance adaptor servers, database servers, Network address translation servers, IRC (Internet Relay Chat) servers, chat servers, X WINDOWS servers, inetd servers, volume shadow copy servers, boot and remote boot servers, finger servers, a secure shell (SSH) servers, who servers, rexec servers, webster servers, conference servers, radius servers, zip servers, afbackup servers, backup servers, ASP (Active Server Pages) servers, fido servers, WAP (Wireless Application Protocol) servers, Plesk® servers (available from SWsoft, Inc., the assignee of this application), Virtuozzo™ servers (available from SWsoft, Inc., the assignee of this application), Virtuozzo for Windows™ servers (available from SWsoft, Inc., the assignee of this application), wireless access servers, wireless routers and wireless access points.

One embodiment of the present invention achieves the goal by performing background synchronization of executable, configuration, and other data used by, associated with, or otherwise related to a process that should be migrated from one location to another further named "a process of concern". Such a data may be either files or memory pages or other data required for process execution. For example, such a data may be real or virtual hardware settings being accessed using system bus and addresses set up for certain hardware means. Further such data may be indicated "memory pages" keeping in mind that other possible data structures may be disclosed by this terms also. Furthermore, while the description herein focuses on migration of a single process of concern from a first server to a second server, it should be apparent to one skilled in the art that a plurality of processes can be migrated without departing from the spirit or the scope of the invention. These processes can be migrated in parallel and/or consequently, and in a particular order chosen by the system administrator.

In this discussion, the term "memory pages" means the memory structures that preferably are presented in an operative hardware memory, but also can be temporarily stored on the hard disk (e.g., in page or swap files). Memory contents may appear to be used, while process execution is actually mapped to different memory locations by actions of the hardware (e.g., of the translation look-a-side buffer (TLB) and page tables managed by the OS kernel).

When entire physical memory (i.e., installed memory modules) is being used, the system can simulate additional memory by using the hard drive to store additional data. The process of storing extra data on the hard drive and treating it as extra memory is known as swapping.

A memory-mapped file is a segment of a virtual memory that has been assigned a direct byte-for-byte correlation with some portion of a file or file-like logical entity. This logical entity can be a file that is physically present on the disk, or it can also be a device, shared memory object, or another logical entity an operating system can reference to through a file descriptor. Once established, the correlation between the file and the memory space allows applications to treat the mapped portion as if it were primary memory.

Figure 2:
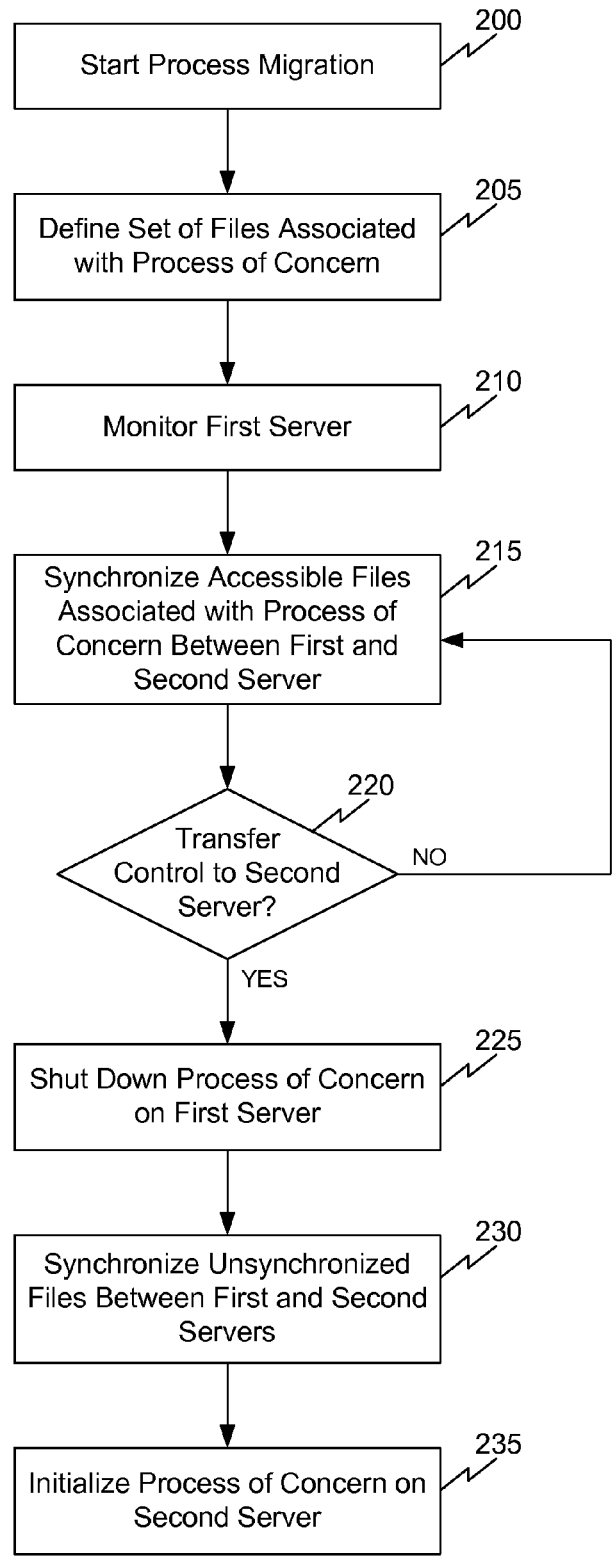
FIG. 2 is a flow chart illustrating a process migration and data synchronization method according to a preferred embodiment of the present invention.

FIG. 2 is a flow chart illustrating a process migration method according to a preferred embodiment of the present invention. In the embodiment illustrated in FIG. 2, process migration preferably begins with the instantiation of a background process that runs on the first server, the second server, a third server, or combinations thereof (step 200). For the purposes of a description of a preferred embodiment, reference will be made to a single background process running on the first server, however, reference to a single process is not intended to limit the present invention to such an embodiment. The background process can be a stand-alone process, can be a number of processes, and also can be a part of the operating system kernel. Also, this process can be as a stand-alone process and/or a number of processes that are associated with the VE or VM. A VM possesses all required attributes that are make up any process, such as, for example virtual memory state, register contents, emulated physical RAM contents, access to the files, etc.

The background process preferably monitors the first server and attempts to migrate and synchronize all memory pages associated with a process of concern from the first server to the second server (step 205). Since the task is not trivial and is time consuming in priority mode files and pages required for current execution of the process in other words data touched by the process are migrated and synchronized. The data synchronization may be implemented as it was described in previous version of the patent application "SYSTEM, COMPUTER PROGRAM PRODUCT AND METHOD FOR ONLINE DATA MIGRATION WITH MINIMAL DOWN-TIME". The background process may also monitor the frequency with which the process of concern accesses one or more pages, to facilitate priority-based data synchronization. Essentially, any pages that are associated with the particular migrating process should be synchronized using the background process. Pages synchronization is required since the memory page once being migrated may change over time on the source server and thereof migration of the process will be incorrect.

Also, files related to the process can be synchronized similar to memory pages at a "block level" of a storage device, such as a disk drive, or any other type of storage device. The blocks of the storage device can store, e.g., file data, metadata, directory data, disk volume data, super-block, partition data, boot sector data, and stream of files. Migration tracking information can also be generated on a block level. A file system is typically stored over such blocks, and the blocks can contain not only file data by itself, but also other data, which, when operating at "block device level" should be also tracked and synchronized to maintain consistency of the file system itself.

The background process also preferably generates tracking information indicating the changes made to data from the time the synchronization process has begun. Furthermore, if a data is currently in use, inaccessible, or the like during an attempted synchronization, the background process can monitor the first server and synchronize a subset of data, which had been in use if and when such subsets become available prior to shutting down the process of concern (step 215).

Such a background data synchronization process is advantageous because it permits the first and second servers to have identical data without stopping the process of concern on the first server. Thus, when the process of concern is shut down on the first server, only relatively few pages will need to be copied to the second server.

The background process can also provide feedback to one or more users monitoring the data synchronization process. Such feedback can include, but is not limited to, a notification indicating that accessible pages have been successfully synchronized from the first server to the second server, a notification that all pages have been successfully synchronized from the first server to the second server, or the like.

The background page synchronization process may be controlled using the specific criteria. Such criteria can be temporal criteria, where the background process is executed for a certain time period. Preferably, the temporal criteria depend on data migration frequency, e.g., traffic or the number of pages migrated per given time period.

Also, the specific criteria may be the relative number of pages being migrated. In this case, the migrated process may be stopped or suspended when the specific criteria is satisfied.

As an option, an iterative data migration process can be used. In this case, a bitmap or bitmaps are used where pages affected by the process of concern are indicated. In the beginning of iterative process, the first bitmap of memory pages is created, where all memory pages associated with the service process in the source system may be marked as unaffected.

Then the process of tracing changes of affected memory pages begins. The tracing changes process and the updating of the bitmap by indications that certain pages are affected is continued until a first criteria is satisfied. The first criteria may be any criteria indicated above or other criteria.

Then, a new bitmap is created that will be used to reflect the memory pages changes during migration process of pages marked in the first bitmap. The new bitmap is then used in the same manner as the first bitmap for next iteration and the bitmap with affected pages marked (then named as the second bitmap) is used for migration affected pages to the destination machine.

The (optional) process of migration of affected pages indicated in the second bitmap is then running in parallel with running the process of concern and with the process of marking affected pages in the first bitmap. When all pages marked in the second bitmap are migrated, the iteration may be finished. Also synchronization of already migrated pages may be provided in parallel with iterative process. Need to be mention that process is not frozen and continue to work and mark pages during iterative migration stage.

Again the first bitmap is used as the second bitmap and the first bitmap of affected pages is created. Next iteration may be started.

It should be mentioned that further continuation of the iterative process depends on the second criteria, e.g., on correlation between the first bitmap and the second bitmap. If pages reflected in both bitmaps are mostly or completely the same, both bitmaps contains most frequently accessed pages and further migration and synchronization is not very useful because during the period of migration of a set of marked pages original process will change most of them. In this case, when the second criteria is satisfied, the service process on the source machine may be frozen.

Next, all memory pages marked in the first bitmap are migrated from the source machine to the destination machine. And next, the service process may be launched on the destination machine.

In other embodiments, migration of affected pages, while the process of concern is running on the source system, may be performed until the amount of affected pages reaches a predefined fraction, e.g., one-half of number or memory space of memory pages being copied to the destination machine.

If the criteria is satisfied, the process of concern on the source machine may be frozen or suspended or also shut down and other memory pages related to the process may be migrated from the source machine to the destination machine. When all required pages are copied, the process of concern is started on the destination machine.

When control can be passed to the destination machine or the second server (step 220), the process of concern is shut down on the first server (step 225). The contents of the first and second servers' memory are then compared, optionally using the tracking information discussed above. Any pages for which fully synchronized copies do not simultaneously exist on both servers will next be synchronized from the first server to the second server (step 230). The process of concern is then initialized on the second server (step 235). This may be necessary for notification regarding information about the state of the copying process (for example, for correct implementation of progress indicator in a graphical user interface).

Figure 3:
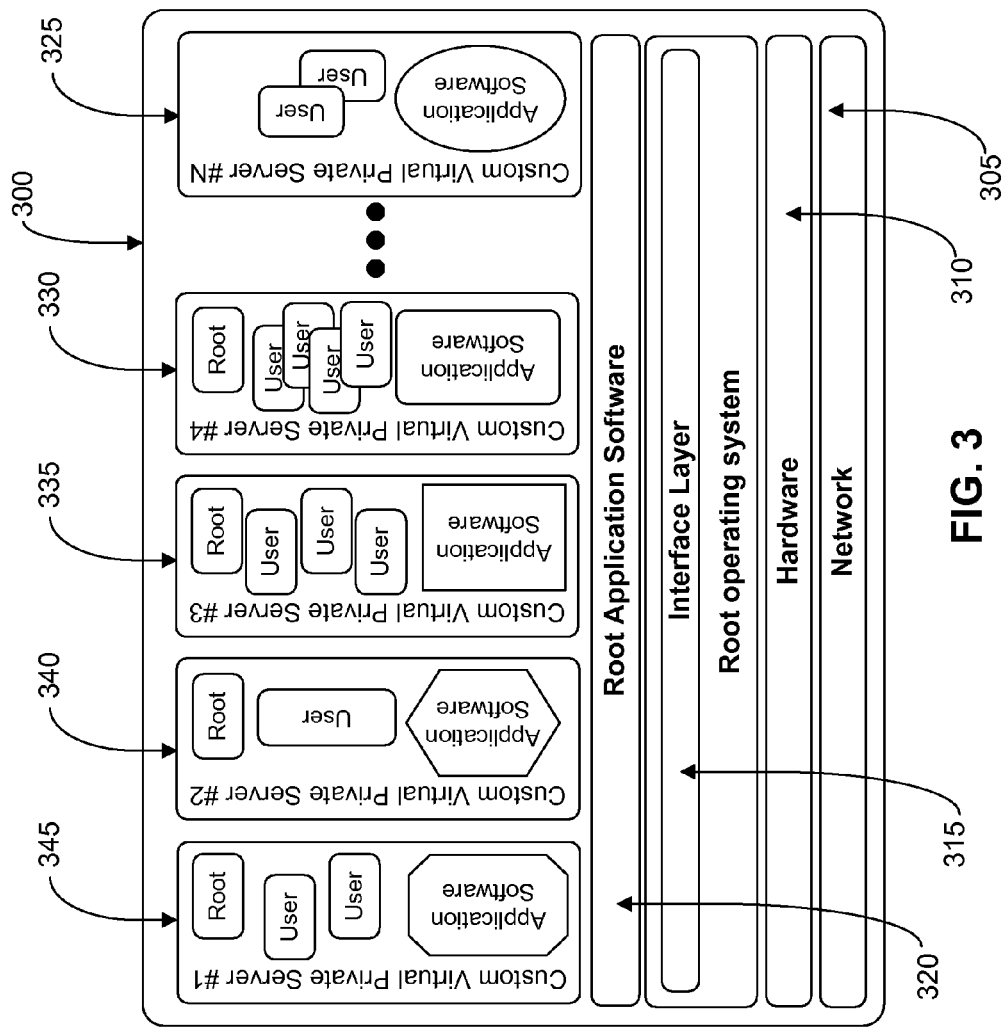
FIG. 3 is a block diagram illustrating a virtual server environment.

The invention may be useful for migrating Virtual Environments, such as a Virtual Private Server illustrated in FIG. 3, or other types of virtual environments, such as VMware, Inc. or Parallels Software International, Inc. virtual machines or the like, as well as other virtualization approaches. This transfer/migration method may be used not only for one VE, but for the groups of VE processes too. So the VE begins with a single physical server 300, preferably containing a network interface card 305; microprocessor, Random Access Memory (RAM), one or more non-volatile storage systems, and other such hardware 310; a base operating system 320; and an interface layer 325 implemented within the operating system 320. The interface layer 325 allows the physical server 300 to be partitioned into many isolated VEs 325, 330, 335, 340 and 345.

Each VE preferably looks and behaves like a complete, networked server system, with its own set of scripts, users, file systems, and the like. In fact, a VE can support entire applications including, but not limited to, applications providing features such as databases, web servers, E-mail servers, and the like.

A VE is typically comprised of a plurality of processes of concern, each of which must be transferred to the second server in the event the first server is shut down. Thus, when physical server 300 is upgraded or when other service is performed on the physical server, the method of the present invention can be used for migrating VEs 325 to 345 from the physical server to another server with only minimal service slowdown.

Another embodiment is directed to further reducing the server down-time by employing transfer/migration method. According to the proposed method, during the one of basic stages the service, being executed on the original machine, does not stop and all the available data required by this process is being copied.

After this basic stage is completed the service continues to be executed without an interruption, while the most of memory pages associated with this process is already transferred to the new machine. However, some pages, which were not copied during previous stage, remains at the original machine. Some pages were not copied because these pages were not accessed by the process of concern.

When the synchronization criteria are satisfied the execution of the service on the first machine is frozen. The pages, which were not available during the previous stage, and the pages, which were changed on the first server after they were copied to the second server, are also copied. Thus, the memory pages at the two machines become maximally identical. The next basic stage ensures that the memory pages on both machines are equal and the second server has a complete set of pages. Then the execution of service is started on the second machine. Thus, the service slowdown may be equal to the duration of this last stage.

The data, which was not copied, in exemplary embodiments, may be determined in two ways: either by the time of last modification of the page or by comparing the contents of the original page and the copies at the two machines. The page comparison can be performed by bit, byte or block matching.

Thus, the migration method allows reducing the service slowdown.

Figure 4:
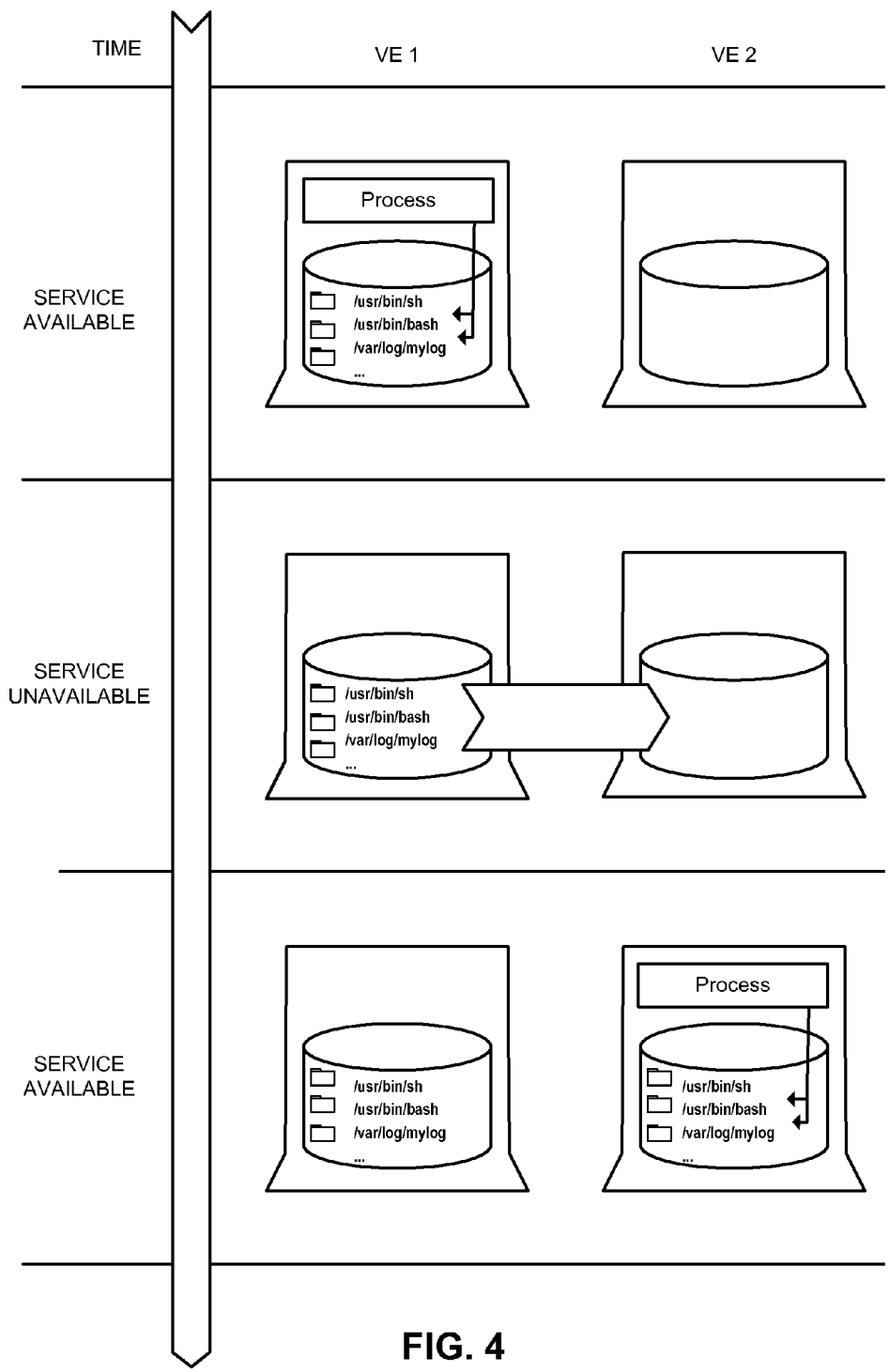
FIG. 4 illustrates a high level view of the migration process with service slowdown.

FIG. 4 illustrates a high level view of a one possible process of a transfer method in terms of file structure. As shown in FIG. 4, with time flowing downward in the figure, the process is initially available and servicing the users on the first machine. At a later time, the service is not available due to service being shutting down, and the files are being copied to the second machine. At a still later time, the process has been instantiated and begins running on the second machine, with all the files having been copied.

As shown in FIG. 4, during the migration process the service can be not available for a short period of service slowdown, because the process being executed at the first machine is stopped and then instantiated on the second machine. The process, being migrated, can be responsible for one specific service. If one process employs a file in an exceptional access mode, then any other processes, trying to provide access to a file, cannot operate in a normal mode. Thus, the specific service influences the operation of the other machine processes requiring access to the files.

To copy the contents of the file employed by the process in the exceptional access mode, the process has to be terminated. As discussed previously, the method for process migration requires transfer of data prior to performing a migration of the process. The process is stopped, the data transfer is completed and finally the process is launched on the new machine. Therefore, while the service slowdown is relatively short it can not be reduced any further.

Figure 5:
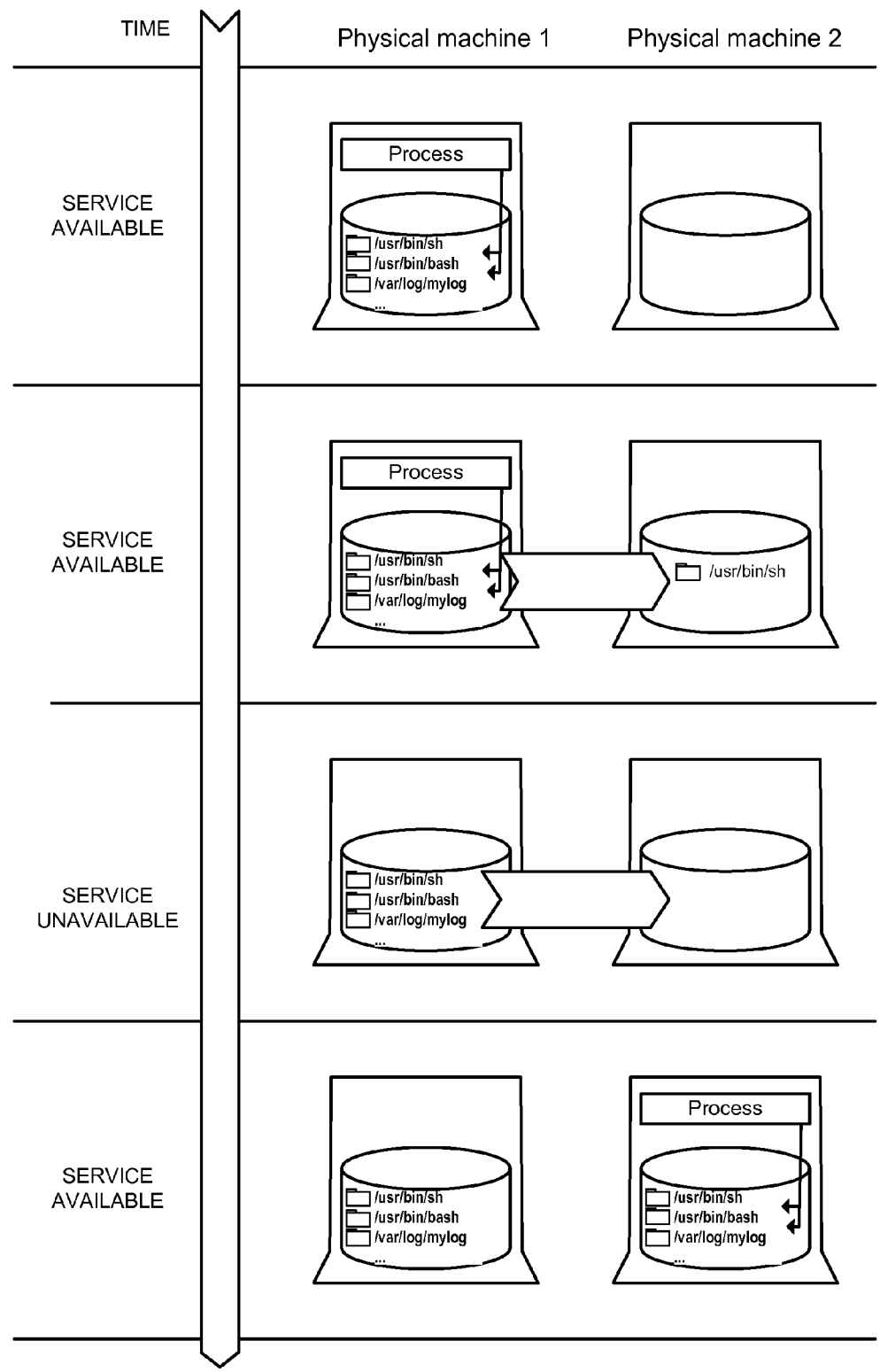
FIG. 5 illustrates the two-stage process transfer method with minimized planned down-time.

The transfer/migration method in terms of file structure is illustrated in FIG. 5.

Here, the main difference from FIG. 4 is that the initial synchronization begins before starting of service shutting down on the original machine, while the data associated with the process of service is being migrated from the first machine to the second machine. In FIG. 5, initial synchronization begins with the process of concern or service, when the service is available. It this stage files are copied from the first machine to the second machine. Then, when the service is unavailable the remaining files that have not yet been synchronized are copied and synchronized to source machine. Finally, service is once again available when the process is restarted on source machine.

Thus, at the beginning of migration, an attempt to copy all data associated with the process/service is carried out. All of the accessible data associated with the process/service is synchronized between the first and the second machine. The data that is in use and is not available for copying are disregarded at this point.

Additional details will be discussed with reference to FIGS. 7A and 7B.

Figure 7A:
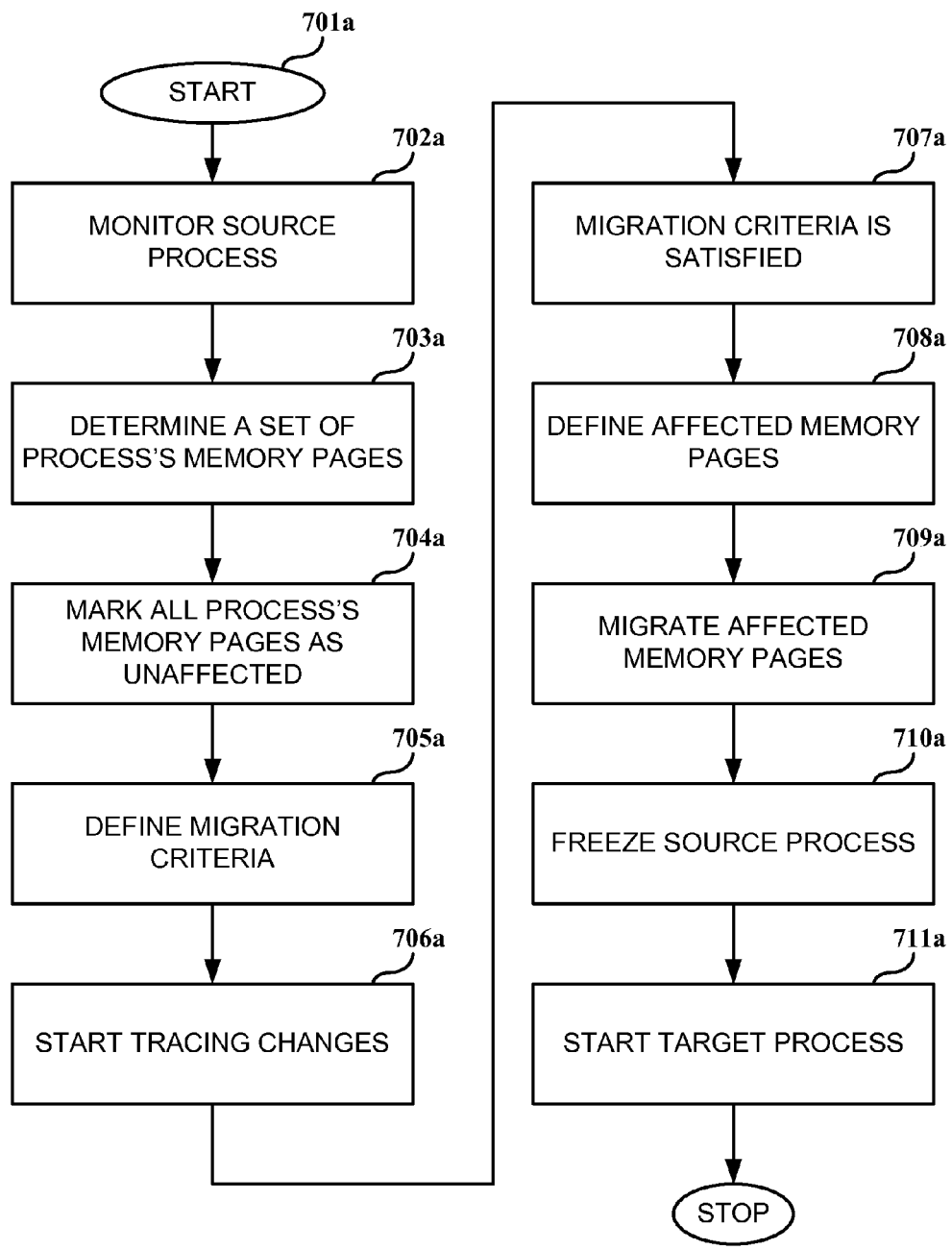
FIGS. 7A and 7B illustrate a block diagram of process migration according to one embodiment of the invention.
Figure 7B:
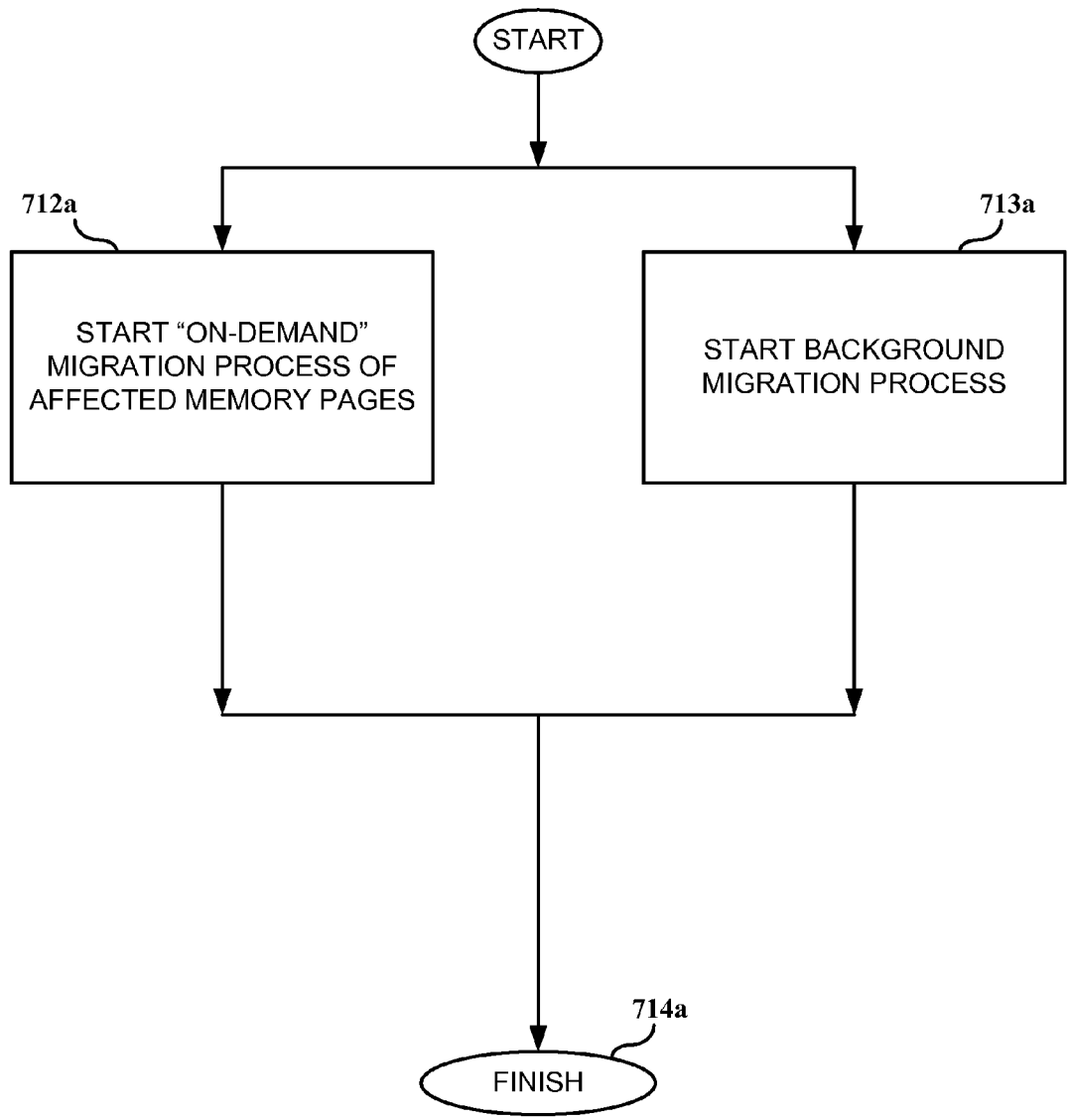

It should be noted that synchronization process is optional for this embodiment, as illustrated in FIGS. 7A and 7B. It can be performed in order to prove that the pages, which have already been copied, remain identical to the pages being employed by the process on the original server. Alternative methods for resolving synchronization task can be performed, such as, for example, employing, by the process, master copies of the files or protecting the files from changes. In one of realizations of preferred invention, if there is an attempting to modify certain page this page may be locked or this page may be ignored by using interrupt handler.

As shown in FIGS. 7A and 7B, once the transfer/migration process starts (step 701*a*), the source VE or other type of Virtual Execution Environment is monitored (step 702*a*). The pages accessible by the VEs on the source machine and the target machine can be synchronized.

The task of a robust process migration is associated with storing the process itself and data required for process execution that involves an operative and a virtual memory. Therefore, memory pages should also be migrated in robust and secure manner.

When a process is executed, the process calls for the memory structures that are needed for process execution. For each process at issue, all the memory pages required for process execution (step 703*a*) are marked as "unaffected" (step 704*a*). After that the specific criteria for the background synchronization process is defined (step 705*a*). Then tracing process detects an access to memory pages during the process execution and marks them as "affected" in data structures, such as for example, bitmaps or hash tables. Marking can be applied to files, registry entries and other structures used for process execution.

In step 706a, tracing of changes is started. Using specific criteria, the affected memory pages are defined (step 708a). The criteria may be satisfied if the amount of migrated memory pages reaches the predefined absolute or relative value, or the predefined time has been expired or the like. Thus, memory pages that should be migrated will be defined when the migration criteria will be satisfied (step 707a). It means that the service process is ready to be migrated and most frequently used pages are transferred. In step 709a, the affected memory pages are migrated.

The memory pages synchronization between the source VE and the target VE is finished. In step 710a, the process of concern on the source VE is frozen. In step 711a, the process of concern is started on the target VE.

Once the process of concern is started on the target VE, the two basic migration processes begin to be executed on the target VE. One of them is the background migration process that migrates remaining memory pages (step 713a). Also, there are some unaffected pages had become affected (i.e., modified) during the running of the process code on the target VE. These affected pages are migrated "on demand" from the source VE to the target VE (step 712a). In step 714a, the migration process is finished.

After the process of concern is frozen on the target machine, the service continues its execution on the original machine, while the most the data is already transferred to the new machine. Thus, the majority of the memory pages required by the process can be migrated from the first machine to the second machine before the start of service slowdown. Some data, however, remains not copied at the original machine. The process on the first machine continues to execute and can change the contents of some of memory pages after they have been copied onto the second machine.

The background process starts tracing the changes made to the data associated with the process of service after the synchronization process had begun. Then the background process marks all the memory pages associated with the process, which had not been changed, as unaffected. At the beginning of the transfer process some pages became "affected" and are copied already on the target machine, optionally using synchronization. The background process synchronizes memory pages between the first and the second machine as an absolute data equality on both machines is required.

Contents synchronization can be accomplished by using standard tools provided by operating system or by using commands like tar, cp, cpio, cop, rcp, ftp, etc., without employing additional software. An open source tool for synchronization called rsync is available in Linux distributions and is widely used in such scenarios. The rsync remote-update protocol allows rsync to transfer just the differences between two sets of files across the network link, using an efficient checksum-search algorithm.

The data is compared not only by the date of last modification and by its size, but also by use of the checksums (or other one-way functions, such as hashes). The checksums can be calculated, for example, by means of an algorithm of cyclic redundancy check (CRC). It provides an accurate comparison of identity of data on both of the machines.

The memory pages and files essential for launch of the process on the second machine are received and the process is initialized on the second machine. Then the memory pages, which were not "affected" by the first machine are migrate "on-demand" if they are requested to be "affected" by the second machine. If all requested to be "affected" pages are migrated to the second machine in a pre-set time, the rest of the "unaffected" pages are migrated to the second machine. After all of the memory pages are migrated to the second machine, the original process, which remains frozen on the first machine, is no longer needed and can be permanently deleted on the first machine.

However, for efficient restoration of the system in a critical situation, it may be necessary to return to an initial state of the process or system. In general, it is possible to isolate and resolve any problems that occur during each phase of the migration. In one embodiment, if migration process produces critical errors, than all migrated data on the second machine can be deleted. The process can be restarted or can continue to be executed on the first machine and another attempt of process migration can be performed. Thus a rollback is executed on the first server. A check pointing process can be used for this purpose as well. In another case the rollback may be implemented without checkpointing. In this case the roll back of the process of concern may be performed on the source machine by simple restarting the process with memory pages related to the process. For successful restoring the process of concern, required memory pages may be protected from corruption or may be kept in the backup file for further restoration. Also the data may be saved on the network storage or another local storage.

Check pointing is the procedure of saving the state of a running application so that it may be subsequently reconstructed, possibly on a different computer. Fault tolerance is achieved by periodically using stable or persistent storage to save the processes' state during failure-free execution. This persistent storage may be, e.g., located on network storage or on another local storage, or the like. Upon failure, a failed process resumes from one of its saved states, thereby reducing the amount of lost computation. Each of the saved states is referred to as a check point.

The system can automatically record the checkpoints according to a specified policy, and can also automatically recover from failures if they occur. For that the required parts of the system (code and data), and any code required to reconstruct the necessary state, are determined. However, the previous state can be restored only while the first machine process exists and the second machine process has not started its execution. If the process migration is unsuccessful, there is a need to remove the process from the second machine and roll back to the process on the first machine.

Figure 8:
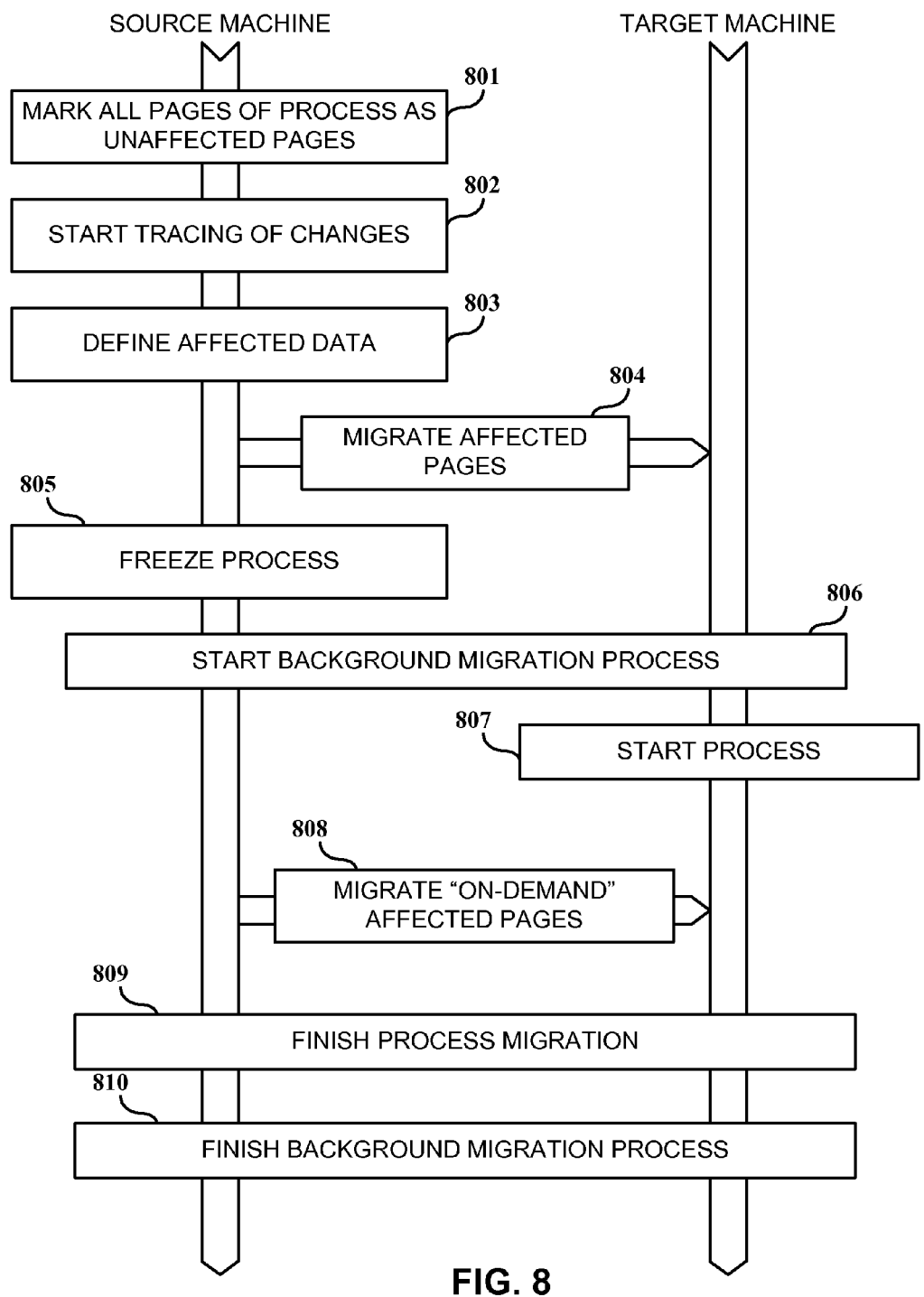
FIG. 8 illustrates a two-stage process migration method according to another embodiment of the invention.

FIG. 8 illustrates the transfer/migration method, including the memory pages synchronization, which results in minimized service slowdown. Once the available memory pages between the first and the second machines are made identical, the pages synchronization process runs between the first and the second machine.

Virtual memory is implemented by using "page tables". The "page table" maps, for every virtual address, a corresponding physical page and contains some properties of the virtual page. When a process being executed affects a memory address, the central processing unit (CPU) looks into the page table to find out what physical page is being affected.

All pages of the process or service are marked as unaffected pages (step 801). While some pages required for process execution can be unaffected even after restarting the process on the second server, they cannot be definitively marked as unaffected pages.

It means that the processes and services exist on the first VE, but they are temporarily suspended. The essential kernel structures and memory pages are migrated (step 804). Thus, the process or service that is executed on the first VE may be frozen (step 805). Then the background migration process is started to trace changes to the pages (step 806), which occur when process is started on the second VE (step 807). Thus, there is a minimum of critical memory pages for launching the process at the new location.

The majority of pages from the first VE are already transferred to the second VE. However, there are a number of pages, which had not been transferred because they were not available to the operating system process responsible for the data copying or because the process or service changed these pages after they had been copied onto the second VE.

Therefore, only relatively few memory pages are needed to be copied to the second VE. Some unaffected pages become affected during process execution on the target VE. Therefore, these pages are migrated "on demand" onto the second VE (step 808). In other case, the user may define the limited time during which all remaining data should be transferred onto the second VE. If not all of the affected files are migrated onto the second VE within a predefined time, the rest of the affected data and files are migrated to the second VE. The migration process can be finished at this point (step 809). After that, the background migration process is finished (step 810).

Through the methods described above, the present invention can facilitate efficient process migration with minimized planned down-time.

The proposed method has an advantage in that the copying of the files for some processes (for example, of some databases or other data files) may be fairly long, particularly in a case of very large databases. Thus, the present invention allows minimizing and planning the service slowdown associated with the file copying. Furthermore, the present invention allows reduction of the service slowdown to a relatively short period even when the data files associated with the process being migrated are very large. In other words, the service slowdown is practically independent of the size of the associated date files.

Thus, the process of migration can begin long in advance of the actual service slowdown, where the majority of the memory pages can be migrated from one server to another server. Additionally, in the case of large files where only portions of the files are actually being modified by the particular process, the portions of the files that are not being modified can be migrated, as long as the background process keeps track of which files have been migrated, and which files have been modified during the migration process. Thus, during the actual service slowdown, only those files that have been modified recently need to be synchronized between the old server and the new server. For a fully online migration procedure (i.e., without an actual shut down and restart of the VE or process being migrated), for example, performed by a temporary freezing of image of the VE or process being migrated, and then a restoration on second server, the proposed online procedure also have the same benefit of minimizing overall delay between last processing of a user request by VE or process on first server and continuation of work on the second server after migration.

Many operating systems have standard utilities that permit synchronizing the contents of two different files that may be affected by concurrently running processes. Such utilities may be used in the present invention to synchronize the files both during the initial stage prior to the planned down-time, and during the planned down-time stage when only the remaining portions of large files and any small files (such as, e.g., log files) with changes need to be synchronized. The use of such utilities can also result in relatively small overhead for the synchronization process from the perspective of both system administrator and the servers.

For example, when a webserver process is being migrated, and the job of the webserver is to maintain graphic heavy web pages, the service slowdown nonetheless is very small, not withstanding the fact that many of the actual pages themselves might be quite large in terms of file size that corresponds to them. This is because the only files that actually need to be synchronized during the service slowdown are the log files and possibly a few other small auxiliary files, while most of the data-intensive files that support the web pages have already been migrated and synchronized prior to the actual service slowdown.

Note that the files of primary interest that need to be copied are being copied from some storage medium, such as a disk drive. As a practical matter, operating systems frequently maintain disk caches, which are used for more rapid access of data in the files on the disk drives. Thus, normally, it is the images of the files in the disk caches that need to be synchronized.

In the embodiment, the preferred approach is to treat data at a file basis, rather than copy a raw data from a disk drive to a disk drive, since synchronization in this case is much easier, and advantage may be taken of operating system utilities, intended for file copying and synchronization. Also, working at a file level means that there are fewer problems of cache flushing and cache management to deal with.

In the case of implementation of migration process at a disk level (or by virtual disk images handled in special files, as implemented in Virtuozzo™ for WINDOWS), the process of synchronization can also be performed at a level of disk device by migration of disk blocks during first and second stages of the proposed migration method.

Although the present invention is applicable to the situation of migrating a single process from one server to another, the more common scenario is where the background process needs to migrate multiple processes. For example, several virtual private servers (VEs) may need to be migrated from a single server to another server, or several user processes may be running with threads within it. Thus, the more likely application is migration of numerous processes, possibly to different servers, and possibly for migration of several processes on VEs to several different servers. The background process is therefore responsible for synchronizing files of the multiple processes being migrated.

The background process is also responsible for dealing with anomalous situations, such as locked files, or files that are deleted by the process being migrated during the service slowdown (in other words, where the deletion of the file of interest has been ordered before the process of concern was frozen, since the process being migrated is normally unaware of the fact of the migration). Thus, in the case of a file being deleted, the background process is responsible for deletion of the file on the destination server. Similarly, the background process needs to take into account the possibility of files being created (in addition to files being deleted).

Although the above description is primarily in terms of shutting down the process one server for online migration, and initializing the process on a second server where the process will be executed, it is also possible to freeze service on the first server, so as to allow it to be restored ("unfrozen") on the second server. This may be referred to as "on-line migration."

Thus, in this embodiment, the primary difference compared to off-line migration described previously is that processes being migrated do not need to pass through "shutdown" or stop stage; and then perform full-size start operation (with all the appropriate initializations, running init scripts, if any, and so on). Usually, in the off-line migration case, services are stopped before the shutdown, TCP connections closed, and became available only after start, and new TCP connections should be installed from clients to servers as well).

However, as noted, it is possible to "freeze/wake up" a process between two servers, rather than perform a complete shutdown/initialization. Thus, the present approach is applicable to both off-line migration, and on-line migration. Because, together with the freezing the process of concern on the source machine, the user may implement the transfer/migration process with planned stopping on the predefined time all of the process associated with this method.

Figure 6:
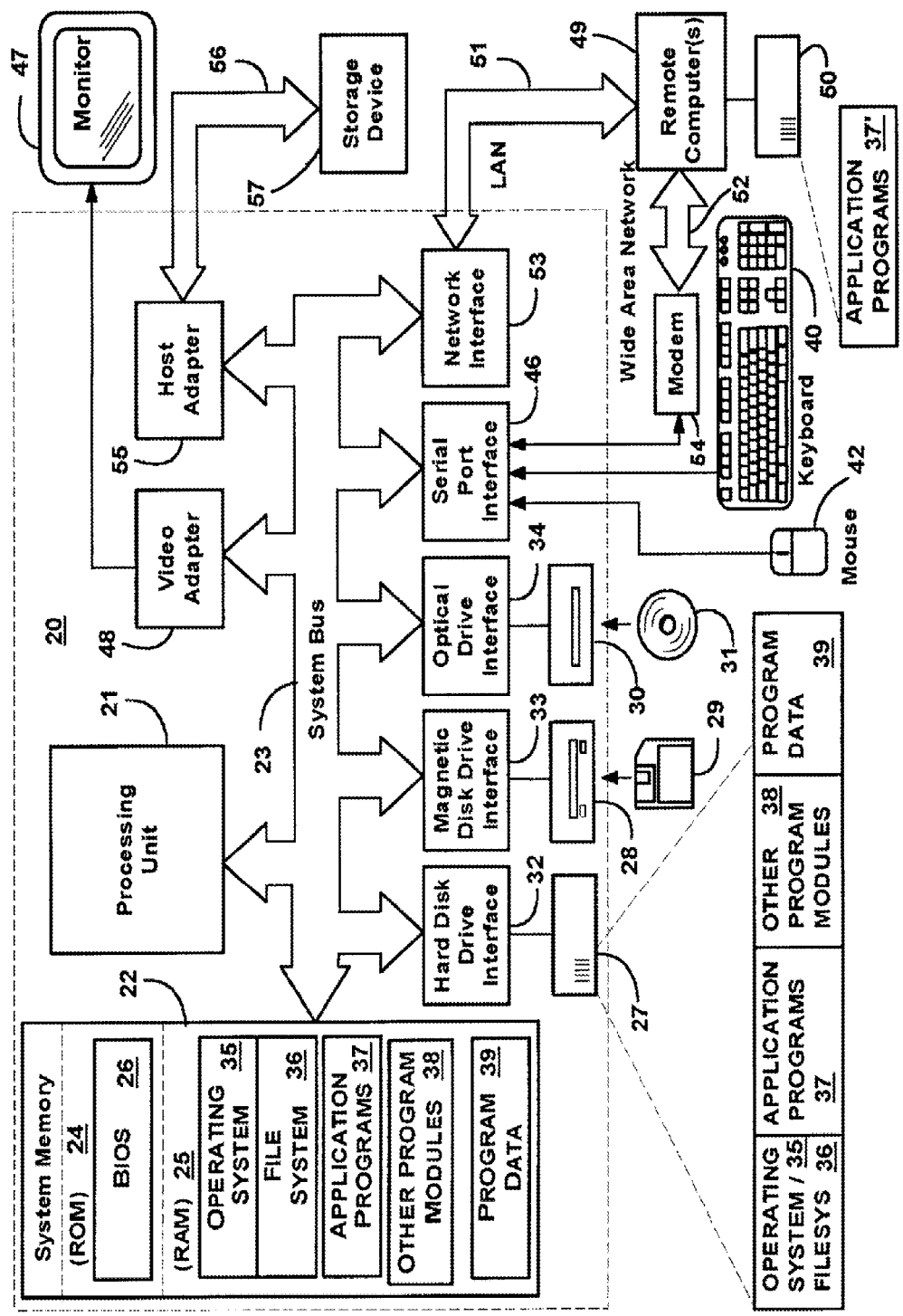
FIG. 6 shows an example of a computer system used for implementation of a proposed method.

With reference to FIG. 6, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown in the figure, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide a non-volatile storage of computer readable instructions, data structures, program modules/subroutines, such that may be used to implement the steps of the method described herein, and other data for the personal computer 20. Although the exemplary environment described herein employs a hard disk, a removable magnetic disk 29 and a removable optical disk 31, it should be appreciated by those skilled in the art that other types of computer readable media that can store data accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices, such as speakers and printers.

The personal computer 20 may operate in a networked environment using logical connections to one or more remote computers 49. The remote computer (or computers) 49 may be represented by a personal computer, a server, a router, a network PC, a peer device or other common network node, and it normally includes many or all of the elements described above relative to the personal computer 20, although only a memory storage device 50 is illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Such computers as described above can be used in conventional networks, e.g. the Internet, local area networks, regional networks, wide area networks, and so forth. These networks can link various resources, such as user computers, servers, Internet service providers, telephones connected to the network and so on.

Having thus described a preferred embodiment, it should be apparent to those skilled in the art that certain advantages of the described method and apparatus have been achieved. It should be appreciated by those skilled in the art that the process migration is achieved with the planned minimized service down-time. It should also be appreciated that various modifications, adaptations, and alternative embodiments thereof may be made within the scope and spirit of the present invention. The invention is further defined by the following claims.

What is claimed is:

1. A method of migrating a service process from a first server to a second server, the method comprising:
    (a) executing the service process on the first server;
    (b) determining a set of memory pages associated with the service process and creating a software-managed bitmap of the memory pages;
    (c) marking all the memory pages associated with the service process as unaffected in the bitmap;
    (d) establishing a migration criteria for indicating whether the service process is ready to be migrated;
    (e) starting a trace of affected memory pages associated with the service process and marking the affected pages in the bitmap;
    (f) when the migration criteria is satisfied, freezing the service process on the first server;
    (g) initializing a background migration process;
    (h) migrating the affected memory pages from the first server to a second server;
    (i) starting the service process on the second server;
    (j) migrating on-demand to the second server memory pages from the first server accessed by the service process on the second server; and

17

(k) migrating remaining memory pages associated with the service process from the first server to the second server using the background migration process, wherein the migration criteria are based on a frequency of newly affected pages.

2. A method of migrating a service process from a first server to a second server, the method comprising:
  (a) executing the service process on the first server;
  (b) determining a set of memory pages associated with the service process;
  (c) creating a first bitmap of memory pages;
  (d) marking all the memory pages associated with the service process as unaffected in the first bitmap;
  (e) starting a trace of affected memory pages associated with the service process;
  (f) marking the affected memory pages in the bitmap until a first criteria being satisfied;
  (g) after the first criteria is satisfied, creating a second bitmap with reflection of memory pages marked in the first bitmap and starting migration of affected memory pages marked in the first bitmap;
  (h) marking the affected memory pages in the second bitmap;
  (i) when all pages marked in the first bitmap are migrated, checking if a second criteria is satisfied;
  (j) if the second criteria is not satisfied, using the second bitmap as the first bitmap and repeating steps (f)-(i);
  (k) if the second criteria is satisfied, freezing the service process on the first server;
  (l) migrating the memory pages marked in the bitmap from the first server to a second server;
  (m) starting the service process on the second server;
  (n) on-demand migrating, to the second server, memory pages from the first server accessed by the service process on the second server; and
  (o) migrating remaining memory pages associated with the service process from the first server to the second server using the background migration process.

3. A method of migrating a service process from a first server to a second server, the method comprising:
  (a) executing the service process on the first server;
  (b) determining a set of memory pages associated with the service process;
  (c) creating a first bitmap of memory pages;
  (d) marking all the memory pages associated with the service process as unaffected in the first bitmap;
  (e) starting a trace of affected memory pages associated with the service process;
  (f) marking the affected memory pages in the bitmap until a first criteria being satisfied;
  (g) after the first criteria is satisfied, creating a second bitmap with reflection of memory pages marked in the first bitmap and starting migration of affected memory pages marked in the first bitmap;
  (h) marking the affected memory pages in the second bitmap;
  (i) when all pages marked in the first bitmap are migrated, checking if a second criteria is satisfied;
  (j) if the second criteria is not satisfied, using the second bitmap as the first bitmap and repeating steps (f)-(i);
  (k) if the second criteria is satisfied, freezing the service process on the first server;
  (l) migrating the memory pages marked in the bitmap from the first server to a second server;
  (m) starting the service process on the second server;

18

(n) on-demand migrating, to the second server, memory pages from the first server accessed by the service process on the second server; and
  migrating remaining memory pages associated with the service process from the first server to the second server using the background migration process,
  wherein the first criteria is satisfied after expiration of time interval from starting the trace of affected memory pages.

4. A method of migrating a service process from a first server to a second server, the method comprising:
  (a) executing the service process on the first server;
  (b) determining a set of memory pages associated with the service process;
  (c) creating a first bitmap of memory pages;
  (d) marking all the memory pages associated with the service process as unaffected in the first bitmap;
  (e) starting a trace of affected memory pages associated with the service process;
  (f) marking the affected memory pages in the bitmap until a first criteria being satisfied;
  (g) after the first criteria is satisfied, creating a second bitmap with reflection of memory pages marked in the first bitmap and starting migration of affected memory pages marked in the first bitmap;
  (h) marking the affected memory pages in the second bitmap;
  (i) when all pages marked in the first bitmap are migrated, checking if a second criteria is satisfied;
  (j) if the second criteria is not satisfied, using the second bitmap as the first bitmap and repeating steps (f)-(i);
  (k) if the second criteria is satisfied, freezing the service process on the first server;
  (l) migrating the memory pages marked in the bitmap from the first server to a second server;
  (m) starting the service process on the second server;
  (n) on-demand migrating, to the second server, memory pages from the first server accessed by the service process on the second server; and
  migrating remaining memory pages associated with the service process from the first server to the second server using the background migration process,
  wherein the second criteria depends on memory pages unmarked in the second bitmap or depends on a ratio of affected pages marked in the first and the second bitmap.

5. The method of claim 2, wherein on-demand migration is performed for accessed pages that are read-only.

6. A method of migrating a service process from a first server to a second server, the method comprising:
  (a) executing the service process on the first server;
  (b) determining a set of memory pages associated with the service process;
  (c) creating a first bitmap of memory pages;
  (d) marking all the memory pages associated with the service process as unaffected in the first bitmap;
  (e) starting a trace of affected memory pages associated with the service process;
  (f) marking the affected memory pages in the bitmap until a first criteria being satisfied;
  (g) after the first criteria is satisfied, creating a second bitmap with reflection of memory pages marked in the first bitmap and starting migration of affected memory pages marked in the first bitmap;
  (h) marking the affected memory pages in the second bitmap;
  (i) when all pages marked in the first bitmap are migrated, checking if a second criteria is satisfied;

(j) if the second criteria is not satisfied, using the second bitmap as the first bitmap and repeating steps (f)-(i);

(k) if the second criteria is satisfied, freezing the service process on the first server;

(l) migrating the memory pages marked in the bitmap from the first server to a second server;

(m) starting the service process on the second server;

(n) on-demand migrating, to the second server, memory pages from the first server accessed by the service process on the second server; and migrating remaining memory pages associated with the service process from the first server to the second server using the background migration process, wherein the migration criteria are temporal characteristics comprising any of:

a frequency of newly affected pages; and a time period from starting the trace of the affected memory pages.

7. The method of claim 2, wherein the first criteria is a total number of the affected pages.

8. The method of claim 2, further comprising termination of the migration of memory pages after a successful completion of the process migration from the first server to the second server and termination of the process on the first server.

9. The method of claim 2, further comprising termination of the migration of memory pages after an unsuccessful process migration from the first server to the second server and termination of the process on the second server and restart of the process on the first server.

10. The method of claim 2, further comprising synchronization of file system of the first server and the second server during the migration of pages.

11. The method of claim 2, wherein steps (b)-(k) are performed on a third server.

12. The method of claim 2, wherein the background migration process runs on the first server.

13. The method of claim 2, wherein the background migration process runs on the second server.

14. The method of claim 2, wherein the service process includes any of a web server, a file server, an FTP server, an authentication server, a Virtual Private Server, a WINDOWS Terminal Service, a POP3 server, an IMAP/IMAP4 server, a SMTP server, a DNS server, a Virtuozzo™ server, and Parallels Server.

15. The method of claim 2, wherein information associated with the process migration is generated at a block level of a hard disk drive.

16. The method of claim 2, wherein the background migration process tracks memory usage by the service process as the service process is being executed on the first server and synchronizes corresponding memory pages to the second server.

17. A non-transitory computer useable recording storage medium having computer program logic stored thereon for executing on a processor, the computer program logic implementing the following steps:

(a) executing the service process on the first server;

(b) determining a set of memory pages associated with the service process;

(c) creating a first software-managed bitmap of memory pages;

(d) marking all the memory pages associated with the service process as unaffected in the first bitmap;

(e) starting a trace of affected memory pages associated with the service process;

(f) marking the affected memory pages in the first bitmap until a first criteria is satisfied;

(g) after the first criteria is satisfied, creating a second software-managed bitmap with reflection of memory pages marked in the first bitmap and starting migration of affected memory pages marked in the first bitmap;

(h) marking the affected memory pages in the second bitmap;

(i) when all pages marked in the first bitmap are migrated, checking if a second criteria is satisfied;

(j) if the second criteria is not satisfied, using the second bitmap as the first bitmap and repeating steps (f)-(i);

(k) if the second criteria is satisfied, freezing the service process on the first server;

(l) migrating the memory pages marked in the bitmap from the first server to a second server;

(m) starting the service process on the second server;

(n) on-demand migrating, to the second server, memory pages from the first server accessed by the service process on the second server; and (o) migrating remaining memory pages associated with the service process from the first server to the second server using the background migration process.

18. A method for migrating a plurality of virtual servers from a first physical server to a second physical server, the method comprising:

running a virtual server process on the first physical server;

determining a set of memory pages associated with the virtual server process and creating a software-managed bitmap of the memory pages;

initializing a background migration process;

marking all the memory pages associated with the virtual server process as unaffected in the bitmap;

establishing a criteria for controlling tracing of the memory pages;

starting tracing changes to the memory pages associated with the virtual server process;

defining memory pages affected by the virtual server process;

completing tracing changes to the memory pages when the criteria is met;

migrating the affected memory pages to the second physical server;

freezing the virtual server process on the first physical server;

initializing the virtual server process on the second physical server;

migrating other affected memory pages from the first physical server to the second physical server;

starting the virtual server process on the second physical server; and migrating remaining memory pages associated with the virtual server process from the first physical server to the second physical server within a background migration process, wherein the criteria are based on a time period from starting the trace of the affected memory pages.

19. The method of claim 18, wherein the background migration process runs on a third physical server.

20. The method of claim 18, wherein the background migration process tracks memory usage by virtual server process as the server process is being executed on the first physical server and synchronizes corresponding memory pages to the second physical server.

21. The method of claim 18, wherein information associated with tracking of the migration is generated at a block level of a hard disk drive.

22. A system for migrating a running service process from a first server to a second server, the system executing the steps of:

executing a service process on the first server;
  determining a set of memory pages associated with the running service process and creating a software-managed bitmap of the memory pages;
  initializing a background migration process;
  marking all memory pages associated with the running service process as unaffected in the bitmap;
  establishing a criteria for tracing the memory pages; starting tracing changes to the memory pages associated with the running service process;
  defining memory pages affected by the service process and marking the pages in the bitmap;
  completing tracing changes to the memory pages when the criteria is met;
  migrating the affected memory pages to the second server;
  freezing the running service process on the first server;
  initializing the service process on the second server;
  migrating other affected memory pages from the first server to the second server;
  starting the service process on the second server; and
  migrating remaining memory pages associated with the service process from the first server to the second server within a background migration process,
  wherein the criteria depends on memory pages unmarked in the bitmap.

23. A system for migrating a plurality of virtual servers from a first physical server to a second physical server, the system executing the steps of:

executing a virtual server process on the first physical server;
  determining a set of memory pages associated with a running virtual server process and creating a software-managed bitmap of the memory pages;
  initializing a background migration process;
  marking all memory pages associated with the running virtual server process as unaffected in the bitmap;
  establishing criteria for controlling the memory pages tracing process;
  starting tracing of the changes to the memory pages associated with the running virtual server process;
  defining memory pages affected by the service process and marking the pages in the bitmap;
  completing tracing of the changes to the memory pages when the criteria is met;
  migrating the affected memory pages to the second physical server;
  freezing the running virtual server process on the first physical server;
  initializing the running virtual server process on the second physical server;
  migrating other affected memory pages from the first physical server to the second physical server;
  starting the service process on the second physical server; and
  migrating remaining memory pages associated with the running virtual server process from the first physical server to the second physical server after a predefined waiting period expires,
  wherein the criteria is satisfied after expiration of time interval from starting the trace of affected memory pages.

* * * * *